Nov. 3, 1936.    F. THOMAS    2,059,417
CONSTANT LEVEL APPARATUS
Filed Nov. 14, 1934    2 Sheets-Sheet 2

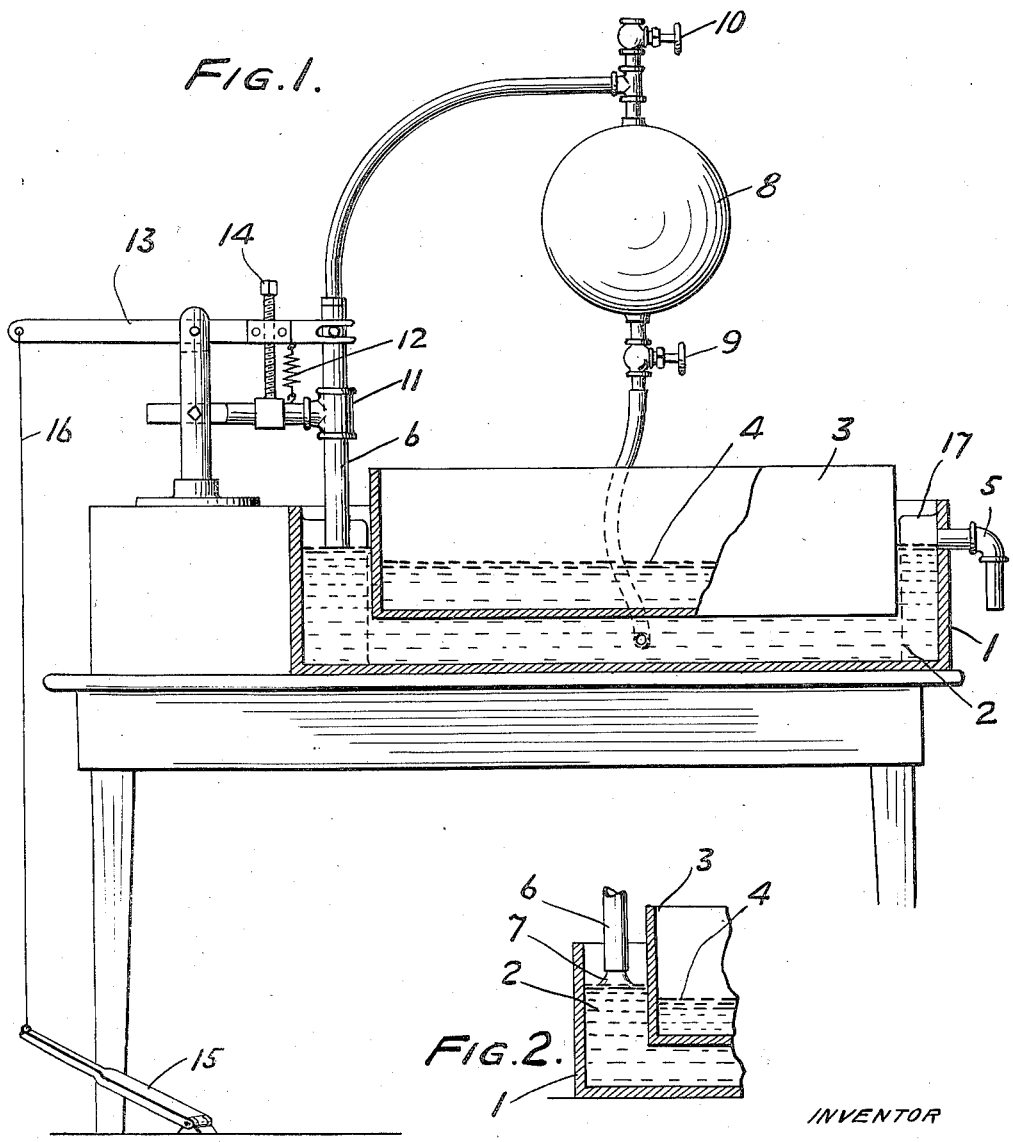

INVENTOR
Frederick Thomas
BY
Augustus B. Stoughton
ATTORNEY.

WITNESS:
Rob R. Kitchel

Patented Nov. 3, 1936

2,059,417

UNITED STATES PATENT OFFICE 2,059,417

CONSTANT LEVEL APPARATUS

Frederick Thomas, Philadelphia, Pa.

Application November 14, 1934, Serial No. 752,977

5 Claims. (Cl. 137—68)

In many arts it is desirable to provide for the maintenance of a constant, or substantially constant, fluid level. One, but not the only, example is in coating the marginal portions of index cards, or like articles, by dipping them into a coating solution. In that case, the dipping machinery usually makes a stroke of constant length, and, unless the level in the bath is kept fairly constant, the coating on the margins of the cards will not be uniform.

It is the object of the present invention to provide for maintaining a substantially constant fluid level in a bath, of which some of the contents is withdrawn or removed from time to time.

Other objects of the invention will appear from the following description at the end of which the invention will be claimed.

Generally stated, the invention comprises a vessel containing a liquid, a tank containing liquid separated from the liquid in said vessel, from one of which the contents are removed from time to time, and means for replenishing the contents of one of said elements in consonance with the removal of the contents of the other element, to keep the level in the last-mentioned element constant, or substantially so, in respect to a fixed, outside point.

The term "liquid" is used throughout the specification and claims to designate any free flowing, non-gaseous fluid.

The invention also comprises the improvements to be presently described and finally claimed.

In the accompanying drawings:

Fig. 1 is an elevational view, partly in section, illustrating one form of apparatus selected from other forms and embodying features of the invention.

Fig. 2 is a sectional view of the detached parts illustrative of the present invention.

Figure 3:
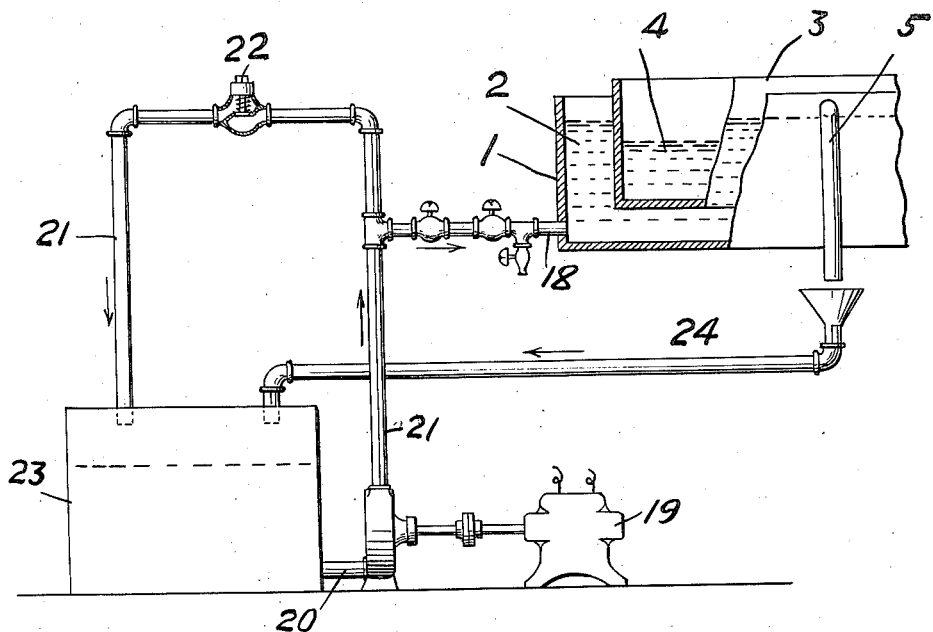
Fig. 3 is a view similar to Fig. 1 illustrating a modification of the invention.

The construction shown in Figs. 1 and 2 is well adapted for use in cases where there is considerable difference in the specific gravities of the liquids. In these figures, 1 is a tank containing a liquid 2, 3 is a vessel floated in said tank and containing a liquid 4, of which same is removed from time to time. 5 is an overflow for the tank. There is an air-bound supply of liquid for the tank and it is provided with a movable dip seal 6 normally sealed by the liquid, and at the end of which a meniscus 7 is formed upon drop of level of the liquid 2, due to change in displacement of the liquid by the vessel 3 upon removal of some of the liquid contents of the vessel.

The air-bound supply is shown to comprise a reservoir 8 communicating by an open connection 9 with the interior of the tank 1. Normally, air is excluded from the reservoir 8. The valve 9 is normally open, and the valve 10 is normally closed and is only opened to renew the supply of liquid in the reservoir 8.

The dip seal 6 is slidably mounted in the fitting 11, and is normally held in dipping position by the spring 12 attached to the centrally pivoted lever 13, which carries an adjustable stop 14. The lever 13 is shown as operated by a foot-treadle 15 connected with it by the connection 16. These elements thus form a manual adjustment to supplement the automatic control. 17 are guides for centering the vessel in the tank and they do not interfere with the free floating of the vessel in the tank.

In describing the operation of the device, it will be assumed that the parts are in the positions indicated in Fig. 1, and that liquid is removed from time to time from the vessel 3. When some liquid is removed from the vessel 3, the total weight of the vessel 3 and contents is reduced, and the extent of its immersion in the liquid in the tank is therefore reduced, so that the level in the liquid falls and a meniscus is formed as at 7 at the end of the seal 6. The operator then lifts the seal 6, by means of foot treadle 15, connection 16 and lever 13, breaking the meniscus and permitting air to enter through the seal 6 into the reservoir 8, so that liquid flows from it into the tank until the level in the tank rises to the overflow 5, and in that way the conditions indicated in Fig. 1 are re-established, so that the level of the liquid in the tank 3, in reference to an outside point, stands just at it did originally.

The construction and mode of operation of the modification shown in Fig. 3 are as above described except as follows:

The liquid level in the tank 1, is kept constant by maintaining an inflow at 18, and an outflow at 5. The pump 19 causes a circulation of liquid through the pipes 20 and 21, past the pressure regulator 22, from and back to the receptacle 23, and some of this liquid reaches the tank 1 by the branch pipe 18, which is fitted with a stop valve and with an adjusting valve, and from the overflow 5 liquid is returned to the receptacle 23 by the pipe 24. In this way the use of liquid is made economical, and by using the same liquid over and over again it may easily be kept at any desired temperature.

Figure 4:
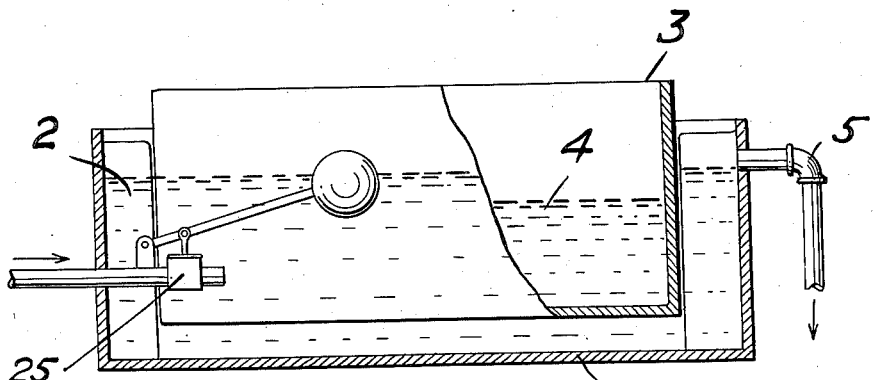
Fig. 4 is a similar view illustrating another modification.

The construction and mode of operation of the modification shown in Fig. 4, are as above described except as follows:

The float valve 25 maintains the level in the tank 1 constant by its ordinary operation, and the overflow 5, becomes an emergency provision.

The construction shown in Figs. 3 and 4 are well adapted for use with liquids of comparatively the same specific gravities.

It will be obvious to those skilled in the art to which the invention relates that modifications may be made in details of procedure and matters of mere form without departing from the spirit of the invention, which is not limited as to such matters or otherwise than the prior art and the appended claims may require.

I claim:

1. A constant level device comprising, in combination, a tank containing a liquid, a vessel floated in said tank and containing a liquid of which some is removed from time to time, and inlet means responsive to change in level due to change in displacement of the liquid in the tank by the vessel upon removal of liquid therefrom and adapted to introduce into the tank a quantity of liquid equivalent to the quantity of liquid removed from the vessel to keep the level in the vessel substantially constant in respect to an outside point.

2. A constant level apparatus comprising, in combination, a tank containing a liquid, a vessel floated in said tank and containing a liquid of which some is removed from time to time, an overflow for the tank, an air-bound supply of liquid for the tank having in the liquid a dip seal which upon drop in level of the liquid due to change in displacement of the liquid by the vessel upon removal of some of the liquid contents provides a meniscus, and said supply operating upon rupture of the meniscus to add to the tank liquid equivalent in quantity to the quantity of liquid removed from the vessel, to keep the level in the vessel substantially constant in respect to an outside fixed point.

3. A constant level apparatus comprising, in combination, a tank containing a liquid, a vessel floated in said tank and containing a liquid of which some is removed from time to time, an overflow for the tank, an air-bound supply reservoir of liquid for the tank having a movable dip seal normally sealed by the liquid and at the end of which a meniscus is formed upon drop of level of the liquid due to change in displacement of the liquid by the vessel upon removal of some of the liquid contents of the vessel, and means for moving the seal to break the meniscus to admit air to the reservoir to add liquid to the tank in quantity equivalent to quantity of liquid removed from the vessel to re-establish the seal and to keep the level in the vessel substantially constant in respect to an outside fixed point.

4. A constant level device comprising in combination, a tank element containing a liquid, a vessel element floated in said tank element, and inlet means responsive to change in level in displacement of the liquid in one of said elements by the other of said elements upon removal of liquid from said other of said elements and adapted to introduce into said one of said elements a quantity of liquid equivalent to the quantity of liquid removed to keep the level of the liquid in said element from which liquid was removed substantially constant in respect to an outside point.

5. A constant level device comprising in combination, a tank element containing a liquid, a vessel element floated in said tank element, inlet means responsive to change in level in displacement of the liquid in one of said elements by the other of said elements upon removal of liquid from said other of said elements and adapted to introduce into said one of said elements a quantity of liquid equivalent to the quantity of liquid removed to keep the level of the liquid in said element from which liquid was removed substantially constant in respect to an outside point, and manually operable means for rendering said inlet means operative or inoperative.

FREDERICK THOMAS.